(12) United States Patent
Donoghue et al.

(10) Patent No.: US 6,288,721 B1
(45) Date of Patent: Sep. 11, 2001

(54) RENDERING PROCESS AND METHOD FOR DIGITAL MAP ILLUMINATION INTENSITY SHADING

(75) Inventors: Patrick Donoghue, Northridge; Tor Kinsinger, Simi Valley, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/348,513

(22) Filed: Jul. 7, 1999

(51) Int. Cl.$^7$ .................................................. G06T 15/60
(52) U.S. Cl. ............................................................ 345/426
(58) Field of Search .................................. 340/525, 990, 340/995; 342/357.13; 345/418, 419, 425–432; 382/225, 270, 285; 395/119, 120, 128, 130; 701/3, 4, 200, 208, 209, 212

(56) References Cited

U.S. PATENT DOCUMENTS

| | | | |
|---|---|---|---|
| 4,855,934 | 8/1989 | Robinson | 364/521 |
| 5,579,456 | 11/1996 | Cosman | 395/128 |
| 5,699,497 | 12/1997 | Erdahl et al. | 395/128 |

OTHER PUBLICATIONS

Litton Guidance & Control Systems, Tactical Aircraft Moving Map Capability (TAMMAC) Program. Nov. 27, 1995, pp. 27,28.

Litton Guidance & Control Systems Div., 19601 Nordhoff Street, Northridge, California, 91324–2422.

*Primary Examiner*—Almis R. Jankus
*Assistant Examiner*—G. F. Cunningham
(74) *Attorney, Agent, or Firm*—Price And Gess

(57) ABSTRACT

A "Rendering Process and Method for Digital Map Illumination Intensity Shading" is disclosed that assigns an illumination intensity to pixels in a video display imaging a mapped terrain. The process comprises the steps of: providing a rectangular grid array of altitude values covering an area to be shaded. Each altitude value has a map position characterized by a coordinate location referenced to a first and second coordinate axes crossing orthogonally at an origin. Each coordinate location has a first and second value. Each first and second value characterizes the distance of the respective coordinate location from the origin. The map area is divided into an array of contiguous triangles. Each triangle area has a perimeter bounded by three straight line segments passing between three coordinate locations. The video display has pixel areas that corresponding to each respective triangle area. A normal vector is calculated for each triangle area. An illumination vector referenced to the coordinate axes is provided that characterizes the direction and intensity I of a light source that illuminates all of the triangle areas. The process calculates a relative angle between the normal vector and the illumination vector for each triangle area and assigns a relative intensity to the pixels that form each triangle. The process then displays the array of triangle areas that form the map area in a video display while adjusting the illumination intensity of each triangle area to correspond to the relative intensity assigned to that pixel area.

15 Claims, 6 Drawing Sheets

RENDERING PROCESS AND METHOD FOR DIGITAL MAP ILLUMINATION INTENSITY SHADING

TECHNICAL FIELD

This invention relates to the field of digital processes for the computer display of map information and more particularly to processes for illuminating and rendering map information in real time for depiction as a moving map display.

BACKGROUND ART

U.S. Pat. No. 5,579,456 for "Direct Rendering of Textured Height Fields" shows the a process for creating "a dynamic textured display, images of textured height fields(elevation samples arrayed on a rectangular coordinate grid, as to represent terrain)" and for rendering the image. However, the process taught re-samples the height field data into a radial form and does not show the process of converting the regular grid raw data into regular interval triangular strips nor the subsequent step of computing the relative illumination of each triangle in the strips, and passing the strips to a graphic processor.

This invention focuses on the specific issues in pre-processing gridded terrain data in order to achieve a real-time, computer efficient formulation for fast execution.

DISCLOSURE OF INVENTION

Figure 1:
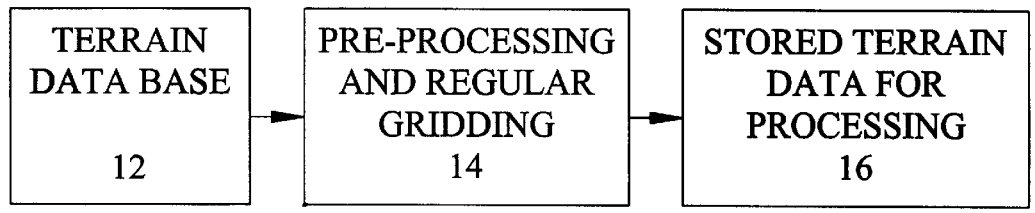
FIG. 1 is a preliminary schematic block diagram of the major steps performed in the shaded map rendering process or method.

FIG. 1 is a block diagram that depicts the steps in processing data to control the intensity of the pixels in a video display, depicting a moving or stationary map, to achieve illumination levels at each location on the video image which simulates the illumination that is produced at each corresponding location on the actual terrain by the actual real time illumination of the sun or moon. The terrain corresponding to the map is physically illuminated by light from the sun or the moon. Cloud cover is not accommodated.

A terrain database 12, such as one from the DMA (Defense Mapping Agency) which is now called NIMA (the National Imagery And Mapping Agency), is obtained as a commercial item. The data supplied is data referred to as DTED (Digital Terrain Elevation Data). The United States Geodetic Survey USGS or commercial sources such as the French Satellite Corporation or the World Five Minute Database are alternate data sources The terrain database supplies an array of numbers representing the height above sea level of locations on the map that correspond to each respective location on the earth.

The second block 14 of FIG. 1 represents the step of pre-processing the data into a regular grid array. The data from NIMA is supplied in a data format that requires no pre-processing. The altitude data is supplied with an origin at a corner having a defined latitude and longitude and with sea level altitudes for regular grid points spaced apart at regular intervals, e.g., 100 meter steps along east-west and north-south axes.

Block 16 represents the steps of storing the data in the computer and formatting the data into a memory array for processing by the computer. An altitude is provided for each ith, and jth position in the grid where "i" represents the horizontal or east-west axis and "j" the vertical or north-south axis.

Figure 2:
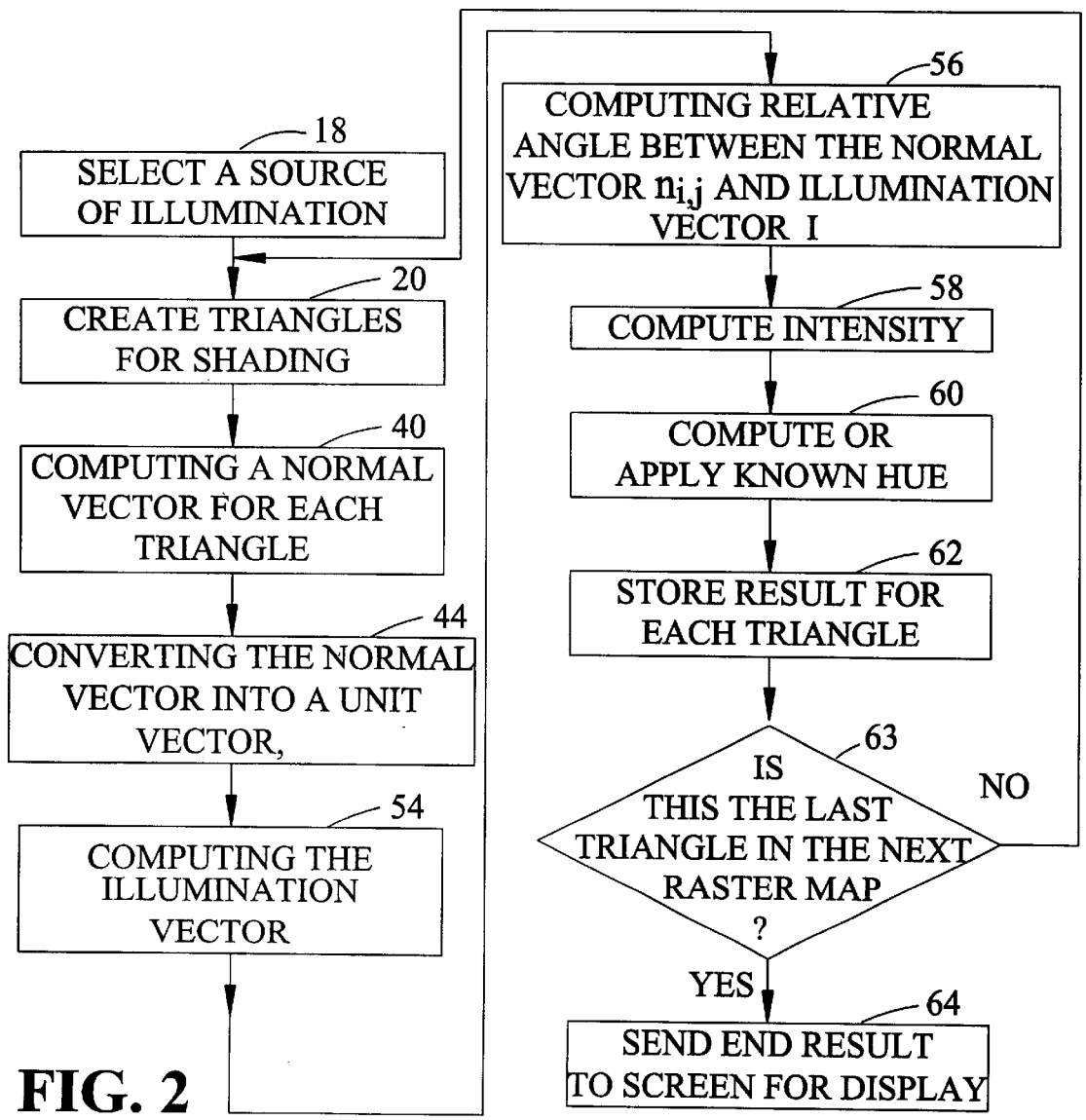
FIG. 2 is a flow chart of the steps performed in the shaded map rendering method.

FIG. 2 is a flow chart listing the steps in a method for real time digital sun/moon shaded map renderings. The steps will now be described in the sequence in which they appear in FIG. 2.

SELECTION OF A SOURCE OF ILLUMINATION

The first step in the invention method is the SELECTION OF A SOURCE OF ILLUMINATION 18. The source of light for illuminating the area covered by the database or user present position is selected and may be an artificial source for use in a trainer or a physical source such as the sun or the moon for use with a display in an actual cockpit environment. The relationship between the source of illumination and each individual map area to be imaged, illuminated and viewed is characterized by the Azimuth angle AZ as measured between a meridian containing each area to be illuminated, the north pole and to a vertical plane containing the area to be illuminated and the source of illumination. An elevation angle EL of the source of illumination is measured or calculated from a locally level plane containing the area to be illuminated to the source of illumination. The Illumination Vector is fixed for each area to be illuminated, The azimuth angle Az of the sun from true north and the elevation angle are obtained from a sun and/or moon almanac, by measurement, or they are generated in real time mathematically using an algorithm along with the time of day and the user's present position. In a later discussion, angles AZ and EL will be used to define an Illumination Vector I in Cartesian Coordinates.

Figure 3:
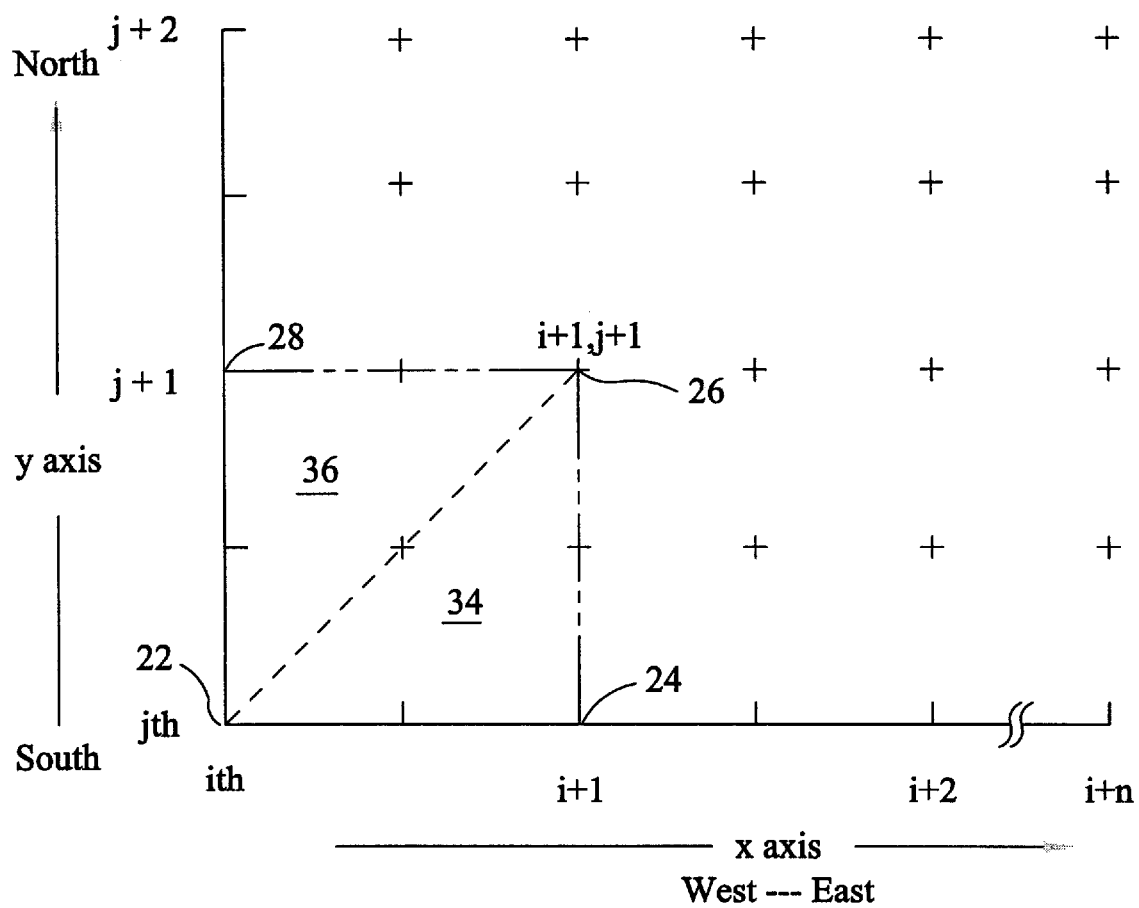
FIG. 3 is a schematic representation of a an array of map points on a grid system corresponding to data from a database providing altitude information for each grid location, with all locations referenced to the known latitude and longitude of the ith,jth reference corner.

CREATE TRIANGLES FOR SHADING:

Block 20 in the flow chart of FIG. 2 represents the step of identifying a triangle for shading. FIG. 3 schematically represents an array or grid of regularly spaced indexed locations that correspond to terrain locations on a map and which correspond to an array of data provided by the database. Each set of four index or grid locations form a square tile such as the four locations at (i,j) 22, (i+1,j) 24, (i+1,j+1) 26 and (i,j+1) 28. Each square tile is divided into a first and second triangle 34, 36 for illumination. The invention method, or process, matches each triangle on the map display with a corresponding terrain position and computes the illumination for each triangle in the array as a function of the angle between an Illumination Vector passing from the source to a triangle and a normal vector extending vertically from the surface of each triangle.

An array of memory locations are reserved in a computer memory system that correspond to the grid locations in the database. The database is then used to load the memory locations with altitude or H (height above sea level) values for each grid location on the map. Each altitude is referenced to the map location and to its respective location in memory by a two-tuple tag, index or address. All data in memory locations are referenced at known distances to the latitude and longitude of the origin address of the database. The first element in each tag corresponds to the east/west sequence number of the H value. The sequence values extend in the x or east direction in FIG. 3 with values that increase as steps extending from i to i+1 to i+2 and so on, where i is initially any positive or negative integer referenced to the database origin. The second element in each tag or index corresponds to the y or north/south sequence number of the H value. The sequence values extend in the y or north direction in FIG. 3 with values that increase as steps extending from j to j+1 to j+2 and so on, where j is initially any positive or negative integer referenced to the database origin.

Figure 4:
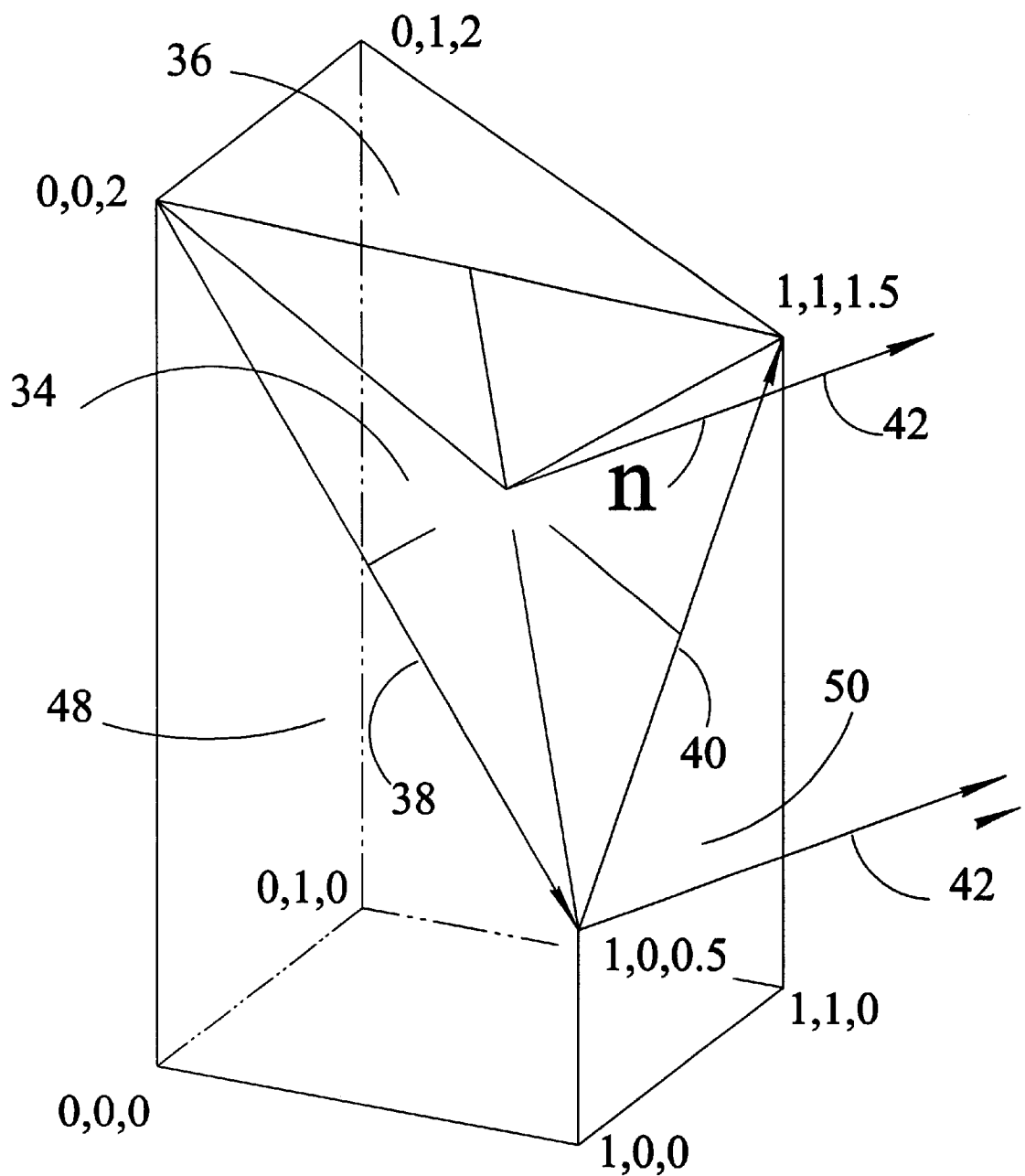
FIG. 4 is a schematic depiction of a pair of triangles formed from a rectangular tile defined by four data points on the grid system of FIG. 3, each data point having a respective altitude above the base plane, with a Normal Vector "n" extending from the junction of two vectors forming the sides of the nearest triangle, the Normal Vector being copied to the center of the same triangle.

FIG. 4 provides a schematic perspective view of the grid of FIG. 3 with the two triangles 34, 36 each having three vertices. Each vertex has an assigned altitude from the database. The three-tuple coordinates for each of the four terrain locations are shown on the figure. The coordinates for the four sea—level coordinate locations are shown at the base.

COMPUTING A NORMAL VECTOR FOR EACH TRIANGLE

Block 40 in the flow chart of FIG. 2 represents the step of COMPUTING A NORMAL VECTOR FOR EACH TRIANGLE. Referring to FIGS. 3 and 4, each triangle 34, 36 is formed from an east-west vector and a north-south vector extending from or to a common point. A unit vector that is normal to the surface of each triangle is obtained by computing the cross product of the two vectors forming the sides of each respective triangle. By way of example, and with particular reference to the schematic perspective view of FIG. 4, it can be seen that a first vector 38 bordering the east-west side of triangle 34 is formed by the ray extending from 0,0,2 to 1,0,0.5. The first vector 38 is therefore an east-west vector formed in the x direction. It is apparent that successive first vectors can thereafter be formed for successive triangles as the data is processed for locations in an east west direction for successive triangles from the ith to the ith +1, to the ith +2 locations, and so on. Each successive location is separated by a defined regular distance, D, e.g., 100 meters.

Referring again to FIG. 4, a second vector 40, on a north-south line in the y-z plane is formed in the y direction from the jth to the jth +1 positions. Each pair of such locations is also separated by the defined regular distance, D, e.g., 100 meters. The cross product of vectors, 38, 40 produces a normal vector $n_{j,i}$ 42 that is perpendicular to the surface of the respective triangle 34.

The normal vector $n_{i,j}$ 42 can be located anywhere on the surface of the triangle 34. Recall that the vector product of two vectors is a vector that can be visualized by reference to the right hand rule. The vector product of any two non-parallel vectors joined to form a triangle is a vector normal to the plane of the two vectors. The normal vector $n_{i,j}$ 42 points in the direction of an advancing wood screw (not shown) as the first vector 38 is rotated toward the second vector 40 in the plane of the triangle 34 formed by the two vectors 38, 40. The magnitude of the cross product of two vectors is equal to the magnitude of the product of the magnitudes of the first and second vectors 38, 40 times the Sin of the angle between the two vectors.

Referring again to FIG. 2, Block 44 represents the step of CONVERTING A NORMAL VECTOR ($n_{i,j}$) 42 INTO A NORMAL UNIT VECTOR.

$$(\overrightarrow{[n_{i,j}]}).$$

Each normal vector $n_{i,j}$ 42 is converted to a normal unit vector $$\overrightarrow{[n_{i,j}]}$$

by dividing the normal vector $n_{i,j}$ 42 by the square root of the sum of the squares of the coefficient of the normal vectors $n_{i,j}$ 42.

Referring again to FIG. 4, the equation for the normal vector is:

$$n_{i,j} = Vx_{i,i+1} \times Vy_{j,j+1} \qquad (1)$$

where $Vx_{i,i+1}$ is a vector 38 in the x,z plane 48. $Vy_{j,j+1}$ is vector 40 in the y,z plane 50. The $Vx_{i,i+1}$ vector 38 has no y component and lies entirely in the x,z plane 48. The $Vy_{j,j+1}$ vector has no x component and lies entirely in the y,z plane 50. Each $Vx_{i,i+1}$ vector has an $H_{i+1} - H_{i,j}$ component in the positive z axis direction, and each $Vy_{j,j+1}$ vector has an $H_{j+1} - H_{i,j}$ component in the positive z axis direction. The three components of each $Vx_{i,i+1}$ vector are expressed below in equation (2) as a column matrix having values of one along the x axis (as a result of normalization relative to the defined regular distance, D), a value of zero along the y axis and a value of $H_{i+1} - H_{i,j}$ along the z axis (due to the change in altitude).

$$[\overrightarrow{Vx_{i,i+1}}] = \begin{bmatrix} 1 \\ 0 \\ H_{i+1} - H_{i,j} \end{bmatrix} \qquad (2)$$

The three components of each $Vy_{j,j+1}$ vector are expressed below in equation (3) as a column matrix having values of zero along the x axis, a value of one along the y axis and a value of $H_{j+1} - H_{i,j}$ along the z axis (due to the change in altitude).

$$[\overrightarrow{Vy_{i,i+1}}] = \begin{bmatrix} 1 \\ 0 \\ H_{j+1} - H_{i,j} \end{bmatrix} \qquad (3)$$

The $Vx_{i,i+1}$ and $Vy_{j,j+1}$ vectors 38, 40 therefore each have a respective ΔH component.

For the purpose of this explanation, the x-axis extends with increasing values to the east and the y-axis with increasing values to the north. As stated above the database selected provides data for each $x_i$, $y_i$ position on the map grid formed by the x and y axes. In this example, all vector components in the x and y directions are normalized to have unity values because the grid spacing is uniform in both north-south and in east-west directions. The use of unity vectors in the x and y directions requires that each altitude above sea level that is supplied for a grid location be normalized or scaled to the defined regular distance value D. For example, a database covering a 10 square kilometer area at 100 meter intervals will provide arrayed altitude data for 10,000 grid locations.

Each quadrille of four adjacent grid locations define the corners of a rectangular area called a tile. Larger regions within the database area are defined by the contiguous arrays of tiles. A 10 kilometer database with 100 meter separations along the x and y axis would define an array of tiles having 99 rows with 99 tiles per row for a total of nearly 10,000 tiles. Where N is the number of altitude values along an edge of a square grid of altitude values, and where in the present embodiment of this invention, each tile is divided into two triangular areas, the database will define $$(N-1)^2(*2)$$

triangles, or nearly 20,000 triangles, thus doubling the resolution for the area covered by the database As stated in equation (1) above, the cross product of each pair of vectors is a vector $n_{i,j}$ that is a normal or perpendicular vector 42 to the surface of the respective triangle. With reference to FIG. 4, equation (4) below is a matrix representation of the cross product of a first vector 38 and a second vector 40, the two vectors of equations (2) and (3) above.

$$n_{i,j} = \begin{bmatrix} x & y & z \\ 1 & 0 & H_{i+1} - H_{i,j} \\ 0 & 1 & H_{j+1} - H_{i,j} \end{bmatrix} = \begin{bmatrix} -\Delta Hx \\ -\Delta Hy \\ 1 \end{bmatrix} \quad (5)$$

Equation (6) below shows the result of assigning a set of arbitrary altitudes to the four data point locations 22, 24, 26 and 28 on FIG. 3 and FIG. 4. Equation (6) shows the step of substituting the arbitrary altitude values from the data points of FIG. 3 into the matrix format of Equation (5).

$$n_{i,j} = \begin{bmatrix} x & y & z \\ 1 & 0 & (0.5 - 2.0) \\ 0 & 1 & (1.5 - 0.5) \end{bmatrix} \quad (6)$$

Expanding the matrix and taking the cross product of Equation (6) yields the normal vector $n_{i,j}$ 42 for the triangle 34 shown below as Equation (7):

$$n_{i,j} = \begin{bmatrix} 1.5 \\ -1 \\ 1 \end{bmatrix} \quad (7)$$

The normal unit vector $$[\overrightarrow{n_{i,j}}]$$

is then calculated in Equation (8) below by dividing each component of the normal vector $n_{i,j}$ by d, the square root of the sum of the squares of the coefficients of the normal vector $n_{i,j}$.

$$d = \sqrt{(1.5)^2 + (-1)^2 + (1)^2} \quad (8)$$

Referring again to FIG. 2, the next step in the invention method is shown in block 54 as the step of COMPUTING THE ILLUMINATION VECTOR I. As explained above, the Illumination Vector I is defined in real time by the Azimuth Angle AZ and the Elevation Angle EL. The Illumination Vector is first converted from the spherical parameters AZ and EL in real time into Cartesian Coordinates by the process steps that will be demonstrated in connection with FIGS. 5 and 6.

Figure 5:
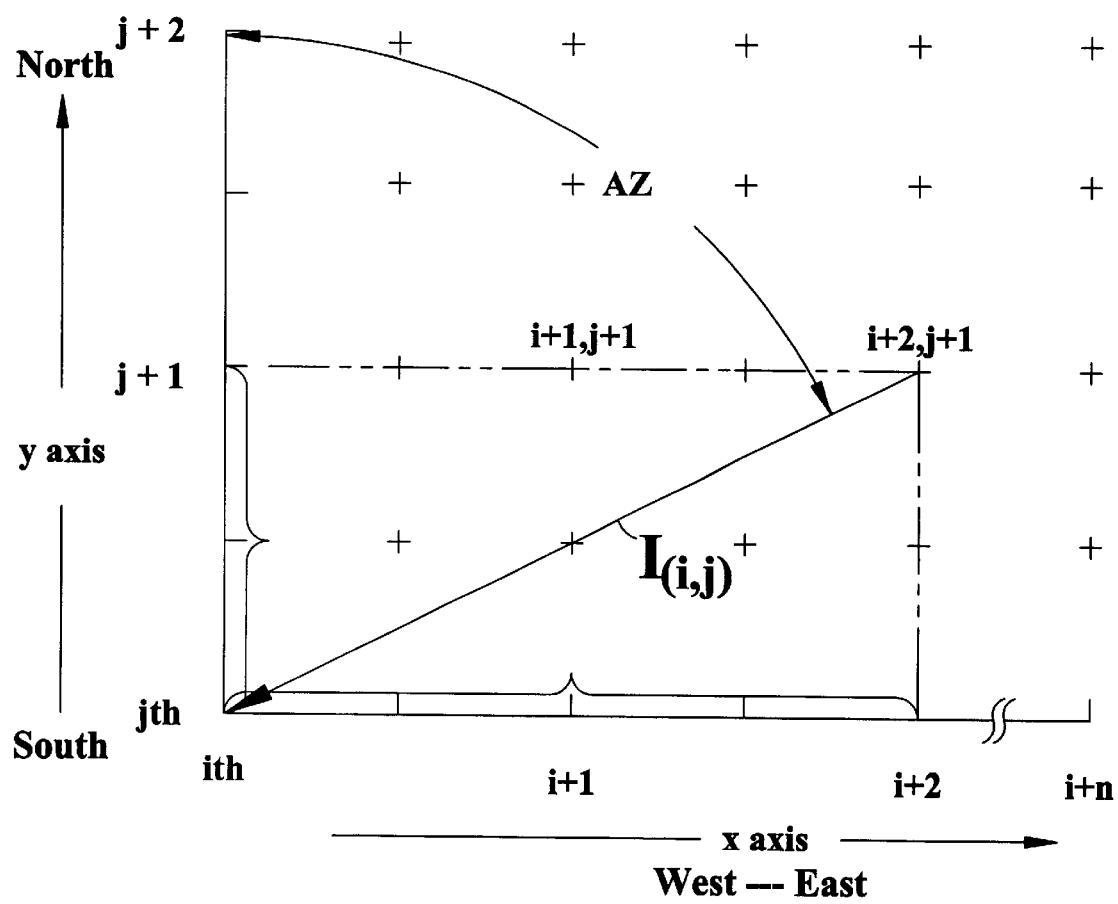
FIG. 5 is a schematic plan view of an Intensity Vector I projected onto the grid of FIG. 3, the Intensity Vector extending with an azimuth angle AZ measured with respect to true north, from a source of illumination to the grid of FIG. 3, the rays being essentially collimated due to the distance of the source from the grid positions.
Figure 6:
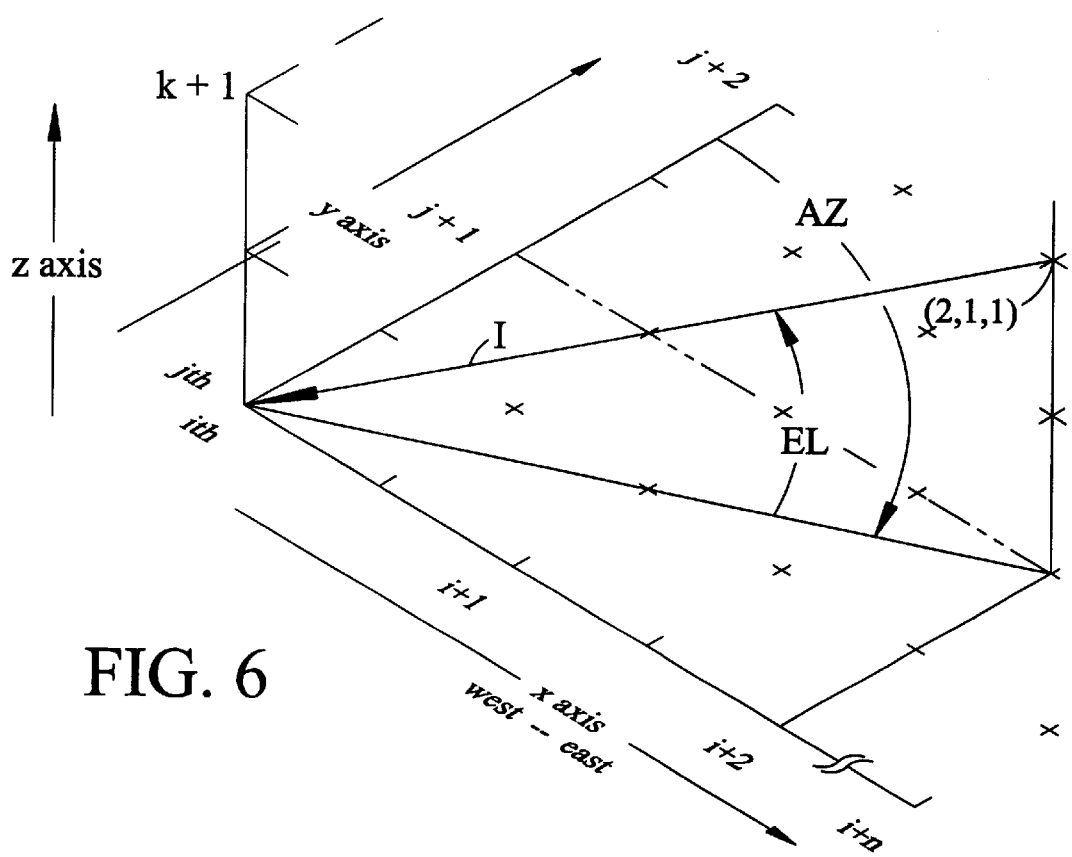
FIG. 6 is a schematic perspective view of the Intensity Vector I extending with an azimuth angle AZ measured with respect to true north, and from an elevation angle EL measured with respect to the locally level plane of the grid of FIG. 3.
Figure 7:
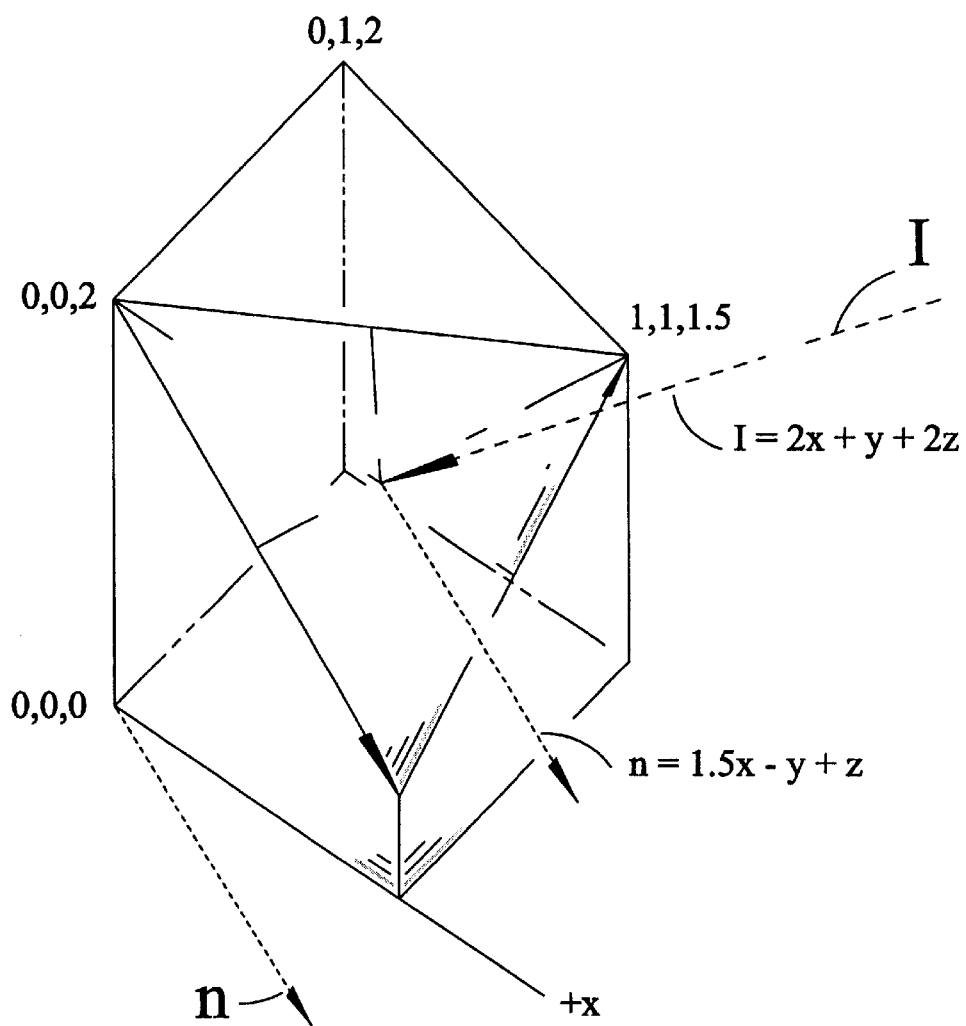
FIG. 7 is a schematic perspective view of Normal Vector n of FIG. 4 extending from a point at the center of the triangle where it intercepts the Intensity Vector I of FIG. 6.

FIGS. 5 and the perspective view of FIG. 6 will assist in explaining the conversion from spherical to Cartesian Coordinates by depicting an arbitrary Illumination Vector I positioned above the array or grid of regularly spaced indexed locations of FIG. 6. The angle AZ is shown in FIG. 5 as being measured from the y-axis on a north-south line to the projection of the Illumination Vector $I_{(i,j)}$ onto the locally level map grid. FIG. 6 shows the angle EL measured from the projection of the Illumination Vector $I_{(i,j)}$ onto the locally level map grid up to the Illumination Vector I. For the purpose of this example, the Vector I is depicted as passing through an arbitrary point, $x_i$, $y_j$, $z_k$, such as grid location 2,1,1. The value of the intensity of the Illumination Vector I is a scalar determined empirically or adjusted to meet the needs of the display and the viewing requirement.

Referring to FIG. 6, if the magnitude of the Illumination Vector I is assigned a value of unity, the projections of Vector I onto the $x_i$, $y_j$, $z_k$ axes forms the Cartesian components of the unity valued Illumination Vector I. The magnitudes of the components of the unity valued Illumination Vector are obtained from the following equations:

$$Ix = Cos(EL)*Sin(AZ) \quad (9)$$

$$Iy = Cos(EL)*Cos(AZ) \quad (10)$$

$$Iz = Sin(EL) \quad (11)$$

and in matrix form, the unit valued Illumination Vector I becomes:

$$\vec{I} = \begin{bmatrix} Cos(EL)*Sin(AZ) \\ Cos(EL)*Cos(AZ) \\ Sin(EL) \end{bmatrix} = \begin{bmatrix} Ix \\ Iy \\ Iz \end{bmatrix} \quad (12)$$

Referring again to FIG. 2, the next step in the invention method is shown in block 56 as the step of COMPUTING THE RELATIVE ANGLE BETWEEN THE NORMAL VECTOR $n_{i,j}$ AND THE ILLUMINATION VECTOR I. The intensity of the illumination reflected by each respective triangle from the Illumination Vector I, representing a light source from the sun or moon, that strikes the surface of each triangle is a i function of the Relative Angle between the Normal Vector $n_{i,j}$ and the Illumination Vector I. The Relative Angle is determined by recalling that the dot product of two vectors yields a scalar with a magnitude equal to the product of the magnitude of the two vectors times the cosine of the angle between the vectors. From the above disclosure, the Normal Vector and the Illumination Vector I are available in Cartesian Coordinates. Therefore, the cosine of the angle between $n_{i,j}$ 42 and I is determined from equations (4) and (11) repeated here below as equations (13) and (14):

$$[\overrightarrow{n_{i,j}}] = \begin{bmatrix} -\Delta Hx \\ -\Delta Hy \\ 1 \end{bmatrix} \quad (13)$$

$$[\overrightarrow{I_{i,j}}] = \begin{bmatrix} Ix \\ Iy \\ Iz \end{bmatrix} \quad (14)$$

The dot product of two vectors is the sum of the products of their respective common direction coefficients.

$$[\overrightarrow{n_{i,j}}] \cdot [\overrightarrow{I_{i,j}}] = \begin{bmatrix} -\Delta Hx \\ -\Delta Hy \\ 1 \end{bmatrix} * [Ix\ Iy\ Iz] \quad (15)$$

and the dot product of the vectors $n_{i,j}$ and I is therefore:

$$[\overrightarrow{n_{i,j}}] \cdot [\overrightarrow{I_{i,j}}] = [-\Delta Hx * Ix - \Delta Hy Iy + Iz] \quad (16)$$

$$[\overrightarrow{n_{i,j}}] \cdot [\overrightarrow{I_{i,j}}] = |n_{i,j}| * |I_{i,j}| * \cos(\psi_{i,j}) \quad (17)$$

The cosine of the angle between vectors $$[\overrightarrow{n_{i,j}}] = \begin{bmatrix} -\Delta Hx \\ -\Delta Hy \\ 1 \end{bmatrix} \text{ and} \quad (18)$$

$$[\overrightarrow{I_{i,j}}] = \begin{bmatrix} Ix \\ Iy \\ Iz \end{bmatrix} \quad (19)$$

is therefore equal to the dot product of the two vectors where the vectors are unit vectors, or where the vectors are not previously reduced to unit vectors, from equation (17) it is shown that:

$$\cos(\psi_{i,j}) = [\overrightarrow{I_{i,j}}] \cdot [\overrightarrow{n_{i,j}}] / |\overrightarrow{I_{i,j}}| * |n_{i,j}|. \quad (20)$$

The resulting Cosine is a scalar that can be used directly or used in a relational or functional manner to select the level of illumination of the space occupied by the triangle when it is imaged on the screen of the display. The relative angle is therefore obtained from the inverse cosine of the angle as indicated below in equation (21).

$$\Psi_{i,j} = \cos^{-1}(\cos(\Psi_{i,j})) \quad (21)$$

Referring again to FIG. 2, the next step in the invention method is shown in block 58 as the step of COMPUTING INTENSITY. By calculating the relative angle $\Psi_{i,j}$ for all triangles and adjusting the INTENSITY for each triangle, the invention obtains an enhanced image closely resembling the area represented by the database. The intensities of the pixels illuminating each triangle are modulated by the intensity function for each respective triangle which is a function of the relative angle $\Psi_{i,j}$ for each respective triangle. The relative angle and the cosine of the relative angle are known at this point in the method.

A first of several alternative intensity functions appears below in equation (22) where the variable K is a scale factor or gain control adjusted automatically or manually by the viewer for the screen image brightness.

$$I(1)_{i,j} = K * \cos(\Psi_{i,j}) \quad (22)$$

Evaluations of this and other intensity functions have indicated that an intensity function of:

$$I(2)_{i,j} = 0.5(1 + \cos(2\Psi_{i,j})) \quad (23)$$

produced a preferred result. With an angle of zero, the relationship is one, or the maximum value of intensity obtainable for a particular triangle. As the angle EL goes to ninety degrees, the light intensity drops off rapidly to zero. Therefore, a preferred alternative intensity function $I(3)_{i,j}$ is as shown below in equation (24) for each triangle.

$$I(3)_{i,j} = (K/2) * (\cos(2\Psi_{i,j}) + 1) \quad (24)$$

Referring again to FIG. 2, the next step in the invention method is shown in block 60 as the step of COMPUTING OR APPLYING KNOWN HUE. The hue or color of each tile or quadrille can be linked to the database or to other known features. By way of example, a region on the mapped area might contain a lake which might be colored blue or, a cultivated area green, and a dry arid region might be colored tan. In the alternative embodiment, altitude information may be encoded. For example, areas below 1000 feet, might be colored green, while features above 1000 feet might shift to red for those pixels at or above that altitude. The specific value of 1000 feet can also be replaced by a programmable value such the current aircraft height or altitude above the terrain.

Referring again to FIG. 2, the next step in the invention method is shown in block 62 as the step "STORE RESULT FOR EACH TRIANGLE". In this step, the intensity and hue, having each been calculated, are each stored in memory locations corresponding to the (i,j) triangle being processed.

Referring again to FIG. 2, the next step in the invention method is shown in block 64 as the step "SEND END RESULT TO SCREEN FOR DISPLAY". A raster map for the screen that is being viewed controls the intensity and hue of each pixel in the raster map. As the geo-location of the user changes, with aircraft flight motion for example, a series of map images are prepared. As the first map is used for the actual control of the raster, a second map image is being prepared. Each first and succeeding raster map is a data array of values that control the intensity and hue or color for each pixel on the image to be displayed or the image that is being displayed.

Referring again to FIG. 2, the next step is shown as a decision block 63 at which point the process tests to see if the triangle being processed "IS THE LAST TRIANGLE IN THE NEXT RASTER MAP?" if a "No" result is determined, the process re-enters the process at block 20. If the result is "Yes", the process advances to block 64 and "SEND END RESULT TO SCREEN FOR DISPLAY" at which point the image map of data is processed for display and the process is re-started at block 18.

As has been suggested, the invention method for this "RENDERING PROCESS AND METHOD FOR DIGITAL MAP ILLUMINATION", or in the alternative for the preparation of REAL TIME DIGITAL SUN/MOON SHADED MAP RENDERINGS has utility in aircraft applications requiring a readable map display. However, other applications involving trainers requiring shaded map displays or those used in land vehicles might also benefit from the illumination method and process taught herein. These and other variations and modifications are considered the equivalents of the corresponding method or process steps explicitly described herein, and thus are within the scope of the invention as defined in the claims that follow.

What is claimed is:

1. A digital shaded map rendering process for assigning an illumination intensity to pixels within a video display formed by a plurality of areas in an array forming the shaded map comprising the steps of:

providing a database that provides a rectangular grid array of altitude values covering a map area to be shaded, each altitude value having a coordinate location referenced to a pair of orthogonal coordinate axes crossing at an origin having a position corresponding to the area to be rendered, dividing the map area into an array of contiguous areas, each area having a perimeter bound by at least three coordinate locations, calculating a normal vector for each area, providing an illumination vector referenced to the orthogonal coordinates axes pointing from and characterizing the intensity I of a light source, calculating a relative angle between each normal vector and the illumination vector for each contiguous area, assigning a relative intensity to each contiguous area, each relative intensity being a function of the relative angle calculated for its respective contiguous area, displaying the array of contiguous areas formed in a video display, each respective contiguous area being illuminated with an optical intensity directly related to its respective relative intensity.

2. The digital shaded map rendering process for assigning an illumination intensity to pixels within a video display of claim 1 wherein the contiguous areas further comprise:

at least one rectangular area.

3. The digital shaded map rendering process for assigning an illumination intensity to pixels within a video display of claim 1 wherein the contiguous areas are substantially square.

4. The digital shaded map rendering process for assigning an illumination intensity to pixels within a video display of claim 1 wherein the contiguous areas further comprise:

at least one substantially square area, each respective square area being divided into first and second triangular areas.

5. The digital shaded map rendering process for assigning an illumination intensity to pixels within a video display of claim 1 wherein the contiguous areas further comprise:

at least two substantially square areas, each respective square area being divided into first and second triangular areas, and wherein,
each altitude assigned to a grid location is referenced to sea level.

6. The digital shaded map rendering process for assigning an illumination intensity to pixels within a video display of claim 1 wherein the contiguous areas are rectangular.

7. The digital shaded map rendering process for assigning an illumination intensity to pixels within a video display of claim 1 further comprising the step of assigning a color to each contiguous area, and wherein the color assigned to each contiguous area is a function of the altitude of the contiguous area.

8. The digital shaded map rendering process for assigning an illumination intensity to pixels within the video display of claim 4 wherein the database is further characterized to provide a texture or material for each square or rectangular area, each texture or material being assigned a corresponding color, the process being further characterized to assign a color to each triangle that corresponds to the respective texture or material of the square or rectangular area in which the triangle is positioned.

9. A digital shaded map rendering method for assigning an illumination intensity to pixels in a video display of the map comprising the steps of:

providing an array of altitude data values covering a map area to be shaded, each altitude value corresponding to a map position on a regularly spaced rectangular grid array of map positions, each map position having a corresponding map coordinate location, referenced to a north-south and an east-west pair of orthogonal coordinate axes crossing at an origin having a known latitude and longitude, dividing the map area into an array of contiguous triangular areas, each triangular area having a perimeter bound by three coordinate locations, each triangular area having a north-south edge bound by sequential coordinates along a north-south line and an east west edge bound by sequential coordinates along an east-west line, forming a north-south vector component characterizing the north-south edge of each triangle and an east-west vector component characterizing the east-west edge of each triangle, calculating a normal vector for each triangular area by calculating the cross-product of each triangles' respective north-south and the east-west vector components, providing an illumination vector referenced to the orthogonal coordinates axes characterizing the intensity I of a light source, calculating a relative ingle between each normal vector and the illumination vector for each triangular area, assigning a relative intensity to each triangular area, each relative intensity being a function of the relative angle calculated for each respective triangular area, displaying an array of triangular areas forming at least a portion of the map area in a video display.

10. The digital shaded map rendering process for assigning an illumination intensity to pixels within a video display of claim 9 wherein the step of assigning a relative intensity to each triangular area further comprises the step of calculating the cosine of the relative angle calculated for each respective triangular area and setting the Intensity for each respective triangle equal to a value proportional to the cosine of the respective relative angle.

11. The digital shaded map rendering process for assigning an illumination intensity to pixels within a video display of claim 9 wherein the step of assigning a relative intensity to each triangular area further comprises the step of calculating the cosine of the relative angle for each respective triangular area and setting the Intensity for each respective triangle equal to a value proportional to the square of the cosine of the corresponding relative angle.

12. The digital shaded map rendering process for assigning an illumination intensity to pixels within a video display of claim 9 wherein the step of assigning a relative intensity to each triangular area further comprises the step of calculating the cosine of the relative angle calculated for each respective triangular area and setting the Intensity for each respective triangle equal to a value proportional to a constant times a term equal to the sum of one plus the cosine of two times the respective relative angle.

13. The digital shaded map rendering process for assigning an illumination intensity to pixels within a video display of claim 9 wherein the database is further characterized to provide a texture or a material for each square or rectangular area, each texture or material being assigned a corresponding color or hue data value, the rendering process being characterized to assign a color or hue data value to each triangle that corresponds to the respective texture or material of the square or rectangular area in which the triangle is positioned, the digital shaded map rendering process further comprising the step of using the coordinates, altitude data values, illumination vector, and hue data for each triangle to form at least a first raster map for the screen that is being viewed to control the intensity and hue of each pixel on the screen forming the array of contiguous areas and their respective triangles.

14. The digital shaded map rendering process for assigning an illumination intensity to pixels within a video display of claim 13 where in the step of forming at least a first raster map further comprises the step forming a second raster map as the geo-location of the user changes, the second raster map being substituted for the first raster map to coordinate changes in the image being viewed with movement of the user.

15. A digital shaded map rendering method for assigning an illumination intensity to pixels in a video display of the map comprising the steps of:

providing a rectangular grid array of altitude values covering a map area to be shaded, the location of each altitude value having a map position characterized by a coordinate location referenced to a pair of orthogonal coordinate axes crossing at an origin, dividing the map area into an array of contiguous polygonal areas, each polygonal area having a perimeter bound by at least three coordinate locations, calculating a normal vector for each polygonal area, by cross product, providing a unity valued illumination vector referenced to an angle AZ and an angle EL;

calculating orthogonal coordinate axes values of the unit valued illumination vector characterizing the intensity of a unity valued light source calculating a relative angle between each normal vector by dot product and the illumination vector for each polygonal area, assigning a relative intensity to each polygonal area, each relative intensity being a function of the relative angle calculated for each respective polygonal area, displaying an array of polygonal areas forming at least a portion of the map area in a video display.

* * * * *